June 2, 1959     H. H. RING ET AL     2,888,734
METHOD OF MAKING HINGE MEMBERS
Filed May 11, 1953     11 Sheets-Sheet 1

INVENTORS.
Harold H. Ring
Wilford E. Shrode
Howard W. Clay
Roy E. McCleary

June 2, 1959  H. H. RING ET AL  2,888,734
METHOD OF MAKING HINGE MEMBERS
Filed May 11, 1953  11 Sheets-Sheet 2

INVENTORS.
Harold H. Ring
Wilford E. Shrode
Howard W. Clay
Roy E. McCleary
ATTY.

June 2, 1959 H. H. RING ET AL 2,888,734
METHOD OF MAKING HINGE MEMBERS
Filed May 11, 1953 11 Sheets-Sheet 8

June 2, 1959     H. H. RING ET AL     2,888,734
METHOD OF MAKING HINGE MEMBERS
Filed May 11, 1953     11 Sheets-Sheet 9

INVENTORS.
Harold H. Ring
Wilford E. Shrode
Howard W. Clay
Roy E. McCleary

ATTY.

United States Patent Office 2,888,734
Patented June 2, 1959

2,888,734

METHOD OF MAKING HINGE MEMBERS

Harold H. Ring, Wilford E. Shrode, Howard W. Clay, and Roy E. McCleary, Rockford, Ill., assignors to Atwood Vacuum Machine Company, Rockford, Ill., a corporation of Illinois Application May 11, 1953, Serial No. 354,256

4 Claims. (Cl. 29—11)

This invention relates to hinges generally and is more particularly concerned with hinges for automobile doors.

The principal object of our invention is to provide hinge members of greater strength and durability and at lower cost by improved means and methods of cold upsetting designed to compact the grain throughout the entire pintle bearing end portions of the hinge members for greatly increased strength and durability and also to give burnished, glassy smooth, and extremely hard, long wearing bearing surfaces on the ends of the knuckles where the greatest amount of wear hitherto occurred. In accordance with our invention, the bearing surfaces are obtained in the upsetting operation by closely confining the tangs laterally during the upsetting so that close accuracy and uniformity as to size and parallelism of surfaces is insured without machining, the elimination of machining operations otherwise required meaning, of course, an appreciable saving in cost.

A salient feature of the present methods and one which accounts for the unique results obtained is the greatly increased length of stroke of the punch in the cold upsetting operation, the entire upsetting being done in one operation in a single long stroke instead of in two or more short strokes. This presented problems which were unique, and resulted in the following:

(1) At first it was thought it would be sufficient to confine the tang at its lateral edges and by the confinement prevent "squashing," that is, bulging of the metal in haphazard fashion in undesired directions. However, that did not prove to be enough if the best results were to be obtained, because, due to the length of tank and the length of stroke in upsetting, there was a tendency for the tang to buckle, thereby disrupting the uniformity of compacting of the metal and giving rise to the danger of serious loss in strength and durability.

(2) This problem of buckling, therefore, led to the additional precaution of providing means in connection with the punch for positively holding or staking the edge portions of the tang to prevent buckling and insure symmetrical compacting of the metal in the upsetting operation. Where staking is employed, as by cutting grooves lengthwise of the edge portions of the tang, these grooves may be erased in the final portion of the stroke as the metal is allowed to fill out the cavity, or the grooves may be left in the bearing surfaces of the knuckle produced by the upsetting of the tang, to be used as oil grooves. Similarly, when the edge portions of the tang are guided in grooves in the upsetting operation, these edge portions may leave these grooves in the final portion of the stroke allowing the metal to fill out the cavity, or the guided edge portions may form wide projecting ribs of small height in relation to width, and these projecting ribs may either be left on the finished knuckle to provide the bearing surfaces on the flats thereof or they may be machined off to provide bearing surfaces the full width of the knuckle.

(3) As a further alternative, the upsetting may also be progressive, that is, the tang may be supported in specially constructed lower die sections so that in the first stage of upsetting, in the first portion of the stroke of the punch, the tang is supported close enough up to the end to reduce likelihood of buckling while the short protruding end portion is partially upset, and then, as the lower die sections recede in the final portion of the stroke of the punch, the rest of the upsetting is done, the portion left projecting being, therefore, always of the same short length so as to avoid likelihood of buckling.

The invention is illustrated in the accompanying drawings, in which—

Figs. 39 to 41 and Figs. 42 to 44 are two sets of views similar to Figs. 36 to 38 showing two other modified or alternative punch constructions adapted to be used interchangeably with the die shown in Fig. 34;

Fig. 50 illustrates the grooving or scoring operation on the tang, Fig. 51 being an edgewise view of the blank showing how the groove thus produced appears in the tang, and Figs. 52 and 53 are sections on the correspondingly numbered lines of Figs. 50 and 48, respectively, showing the grooves in the tang and in the upset head or knuckle portion;

Figs. 54 and 55 are views similar to Figs. 48 and 49 showing an upset blank produced with a set of dies like that shown in Figs. 42 to 44 and 34, and related Fig. 56 shows, similarly as in Fig. 50, how the tang portion of the blank is scored or grooved, and as it appears in the edgewise view of the blank in Fig. 57, Fig. 58 being a section through the grooved or scored portion, Fig. 59 a section through the other portion of the tang, as indicated by the section lines in Fig. 56, and Fig. 60 a section through the upset head or knuckle portion of the blank taken on the line 60—60 of Fig. 54, and Figs. 61 to 65 are views similar to Figs. 11 to 15 showing still another set of dies or modified or alternative construction, designed to give by progressive upsetting in a single stroke of the ram the equivalent of two stages of upsetting in two strokes, by virtue of special novel construction of the lower die sections.

Similar reference numerals are applied to corresponding parts throughout these views.

Figure 5:
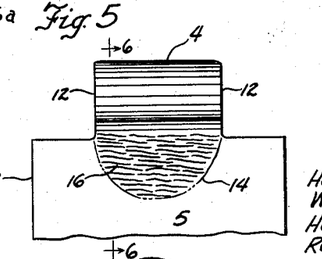
Fig. 5 is a face view of an upset blank indicating by shade lines the actual surface appearance of and the extent to which the area of compressed metal extends into the shank portion as a result of the long stroke upsetting.
Figure 6:
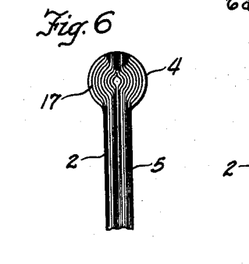
Fig. 6 is an illustration of an etched section on the line 6—6 of Fig. 5 showing how the grain lines appear, indicating the truly symmetrical compression of the metal.
Figure 7:
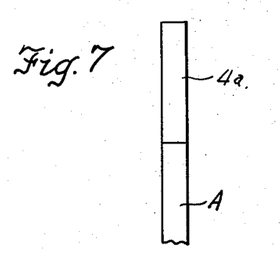
Figs. 7 to 10 are edgewise views of the tang end of a blank from start to finish of the upsetting operation, the related Figs. 7a to 10a being face views.
Figure 7A:
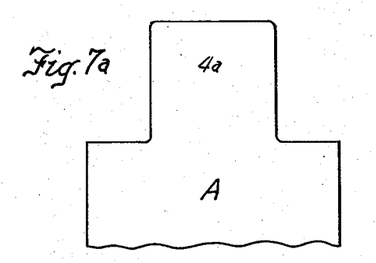

Referring to the drawings and at first mainly to Figs. 1 to 10, the reference numeral 1 designates generally a butt hinge made in accordance with our invention, and it will be understood, of course, that while the male member 2 and female member 3 are both shown as straight, the knuckle or head ends of these members in the case of a hinge for an automobile door, will be bent so as to offset the knuckle 4 in relation to the attaching shank portion 5 or offset the knuckle portions 6 in relation to the attaching shank portion 7, or both, such offsets being common in automobile door hinges, as illustrated for example, in Atwood Patent #1,671,962, in order to permit swinging of the shank portions 5 and 7 into closely spaced parallel relation. Pintle holes 8 and 9 are drilled in the knuckles 4 and 6, respectively, to receive the pintle 10 with a press fit in holes 9 and working fit in hole 8. Knurling may be provided on the pintle as shown at 11 to insure its staying fixed in relation to hinge member 7. The knuckles 4 and 6, in accordance with our invention, are formed completely by a single upsetting operation on each blank without the necessity for any machining other than the drilling of the pintle holes, with a view to compacting the grain throughout the entire pintle bearing end portions of the hinge members for greatly increased strength and durability and also to give burnished, glassy smooth, and extremely hard, long wearing bearing surfaces on the ends 12 of knuckle 4 and the abutting ends 13 of knuckles 6, where the greatest amount of wear hitherto occurred. The hardness of the bearing surfaces 12 and 13 checked on a Rockwell hardness tester is B94, as compared with a hardness of only B77 of corresponding bearing surfaces on forged hinge members and only B69 in the case of rolled hinge members, in both of which latter cases the bearing surfaces are defined by milling off the ends of the knuckles in the conventional way. The hardness in the present case was found to extend throughout all of the section of the metal upset, as indicated by a Rockwell hardness of B97 in the pintle holes 8 and 9, as compared with a hardness of only B86 in the pintle holes of forged hinge members and only B74 in rolled hinge members. The long bearing life which this increased hardness in the pintle holes insures is believed to be self-evident. The increase in strength is due to the fact that the compression of the metal extends way back into the attaching shank portions 5 and 7, as indicated by the faint outlines 14 and 15, as can actually be seen by shimmer lines on the surface, as indicated by shade lines 16 in Fig. 5. In other words, compacting is easily noticeable on the surface throughout the areas indicated at 14 and 15 but the compacting does not stop at the lines 14 and 15 but actually extends much farther inwardly to a gradually diminishing degree, thereby giving greater strength than if there was an abrupt line of demarcation between the compacted metal and the uncompacted metal. Compacting of the grain is also indicated when the metal is etched, as for example is shown in Fig. 6, wherein the lines 17 correspond to what are seen when a section cut along the line 6—6 of Fig. 5 is etched. It will be noticed how these grain lines are curved symmetrically in the knuckle portion 4 showing substantially equal compression on opposite sides of a central plane through the knuckle. Even compression is important for maximum strength and durability. Hence, it is necessary where the upsetting stroke is as long as herein disclosed to support the tang at its lateral edges during the upsetting operation to prevent buckling and insure the symmetrical compacting of the metal indicated in Fig. 6.

Figures 2, 3, 4:
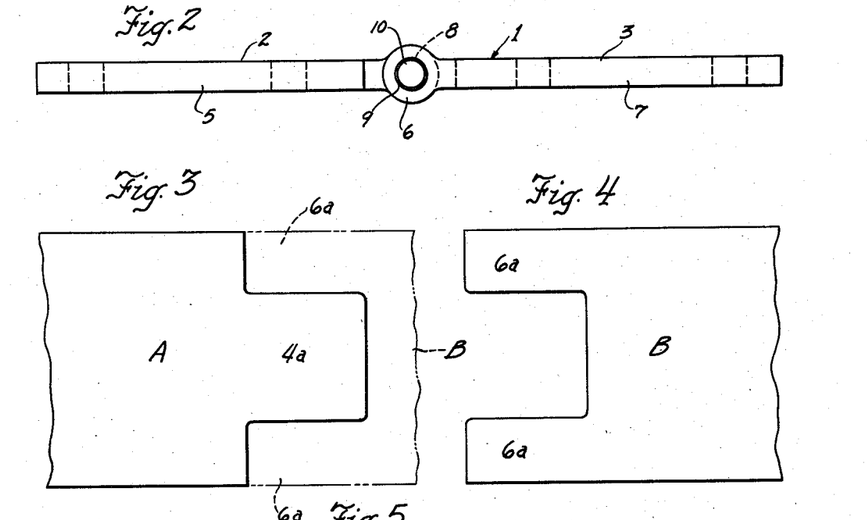
Figs. 3 and 4 are face views of the tang end portions of two blanks for a male and a female hinge member, respectively, Fig. 3 including in dotted lines a showing of how the tang end portion of the cooperating female hinge member is blanked out in the same punching operation so that blanks for two mating hinge members can be formed in one operation without any waste.

Referring to Figs. 3 and 4, blanks A and B, from which the hinge members 5 and 7 are subsequently produced by upsetting of the tang portions 4a and 6a, are punched from strip stock, a indicated by the dotted outline of the end of blank B in Fig. 3, so that there is no waste. The tangs 4a and 6a are of the same width as the ultimate knuckles 4 and 6, respectively, and these width dimensions of the tangs are maintained during the upsetting operations in accordance with our invention, so that the knuckles 4 and 6 will not require any machining on the ends and the knuckles will interfit nicely and pivot freely with respect to one another when interconnected by a pintle 10.

Figure 8:
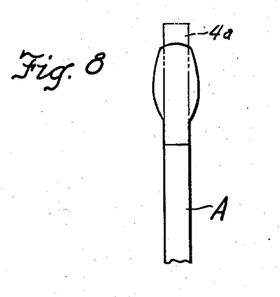
Figure 8A:
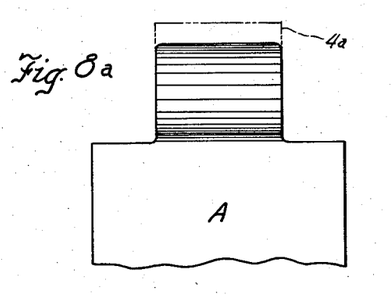
Figure 9:
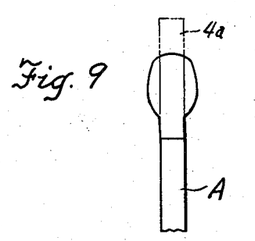
Figure 9A:
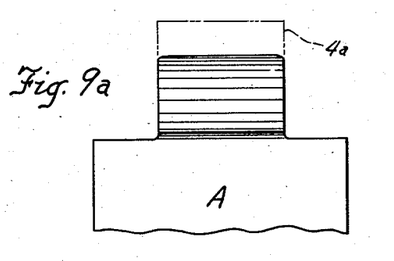
Figure 10:
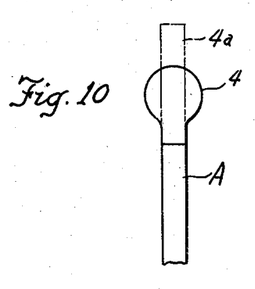
Figure 10A:
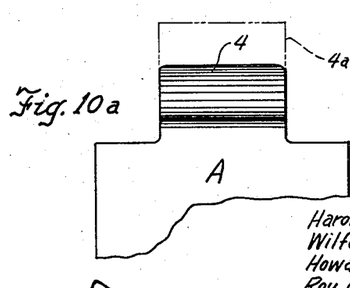
Figure 11:
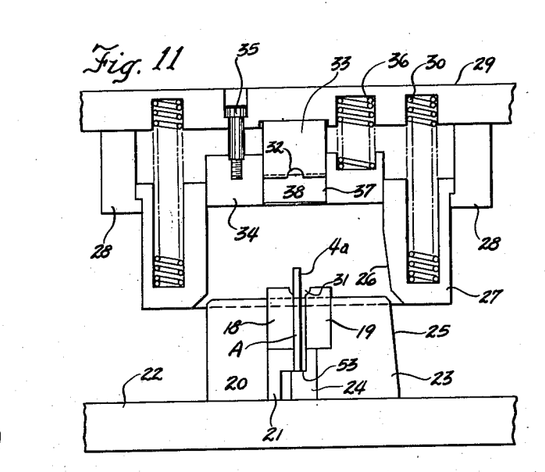
Figs. 11, 12 and 13 are more or less diagrammatic vertical sections through a set of dies adapted to perform the long stroke upsetting, the punch being shown fully retracted in Fig. 11, at the start of the upsetting in Fig. 12, and at the end of the operation in Fig. 13, cross-hatching of parts being purposely omitted to enable better reading of numerals and easier understanding of the construction and mode of operation.

In Figs. 7 to 10 the upsetting of the tang 4a of blank A is illustrated and it is evident by a comparison of the initial tang length, indicated in dotted outline in Figs. 8, 9, and 10, with the full line outline of the upset head or knuckle 4 that the upsetting stroke is much longer than has heretofore been generally recognized as the limit by ones skilled in the art.

Figure 12:
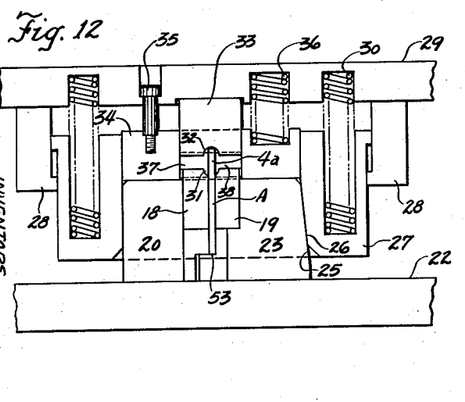
Figure 13:
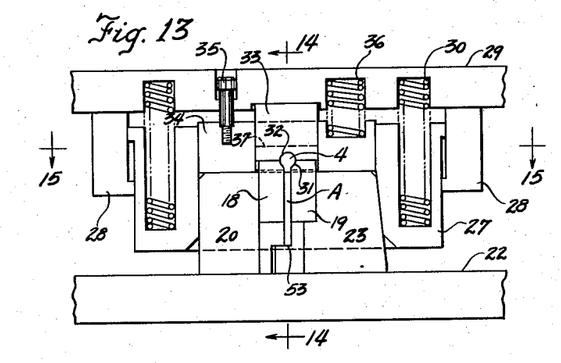
Figures 14, 15:
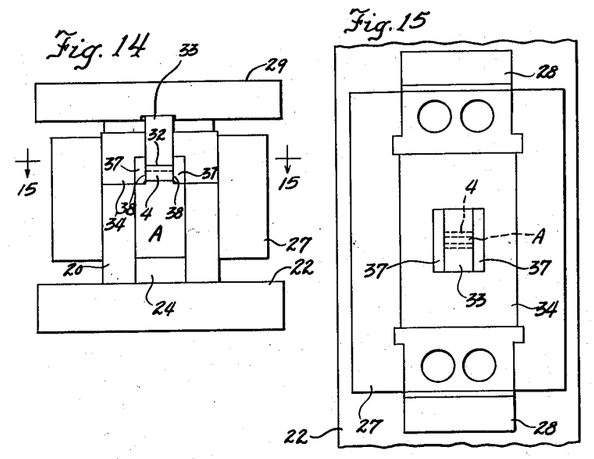
Fig. 14 is a diagrammatical vertical section of the line 14—14 of Fig. 13.
Fig. 15 is a diagrammatic horizontal section on the line 15—15 of Figs. 13 and 14.
Figure 16:
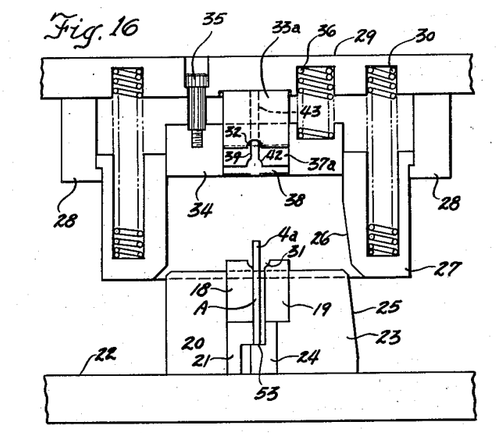
Figs. 16 to 20 are views similar to Figs. 11 to 15 showing a modified or alternative set of dies which operate similarly but hold the edge portions of the tang during the upsetting to prevent further buckling.
Figure 17:
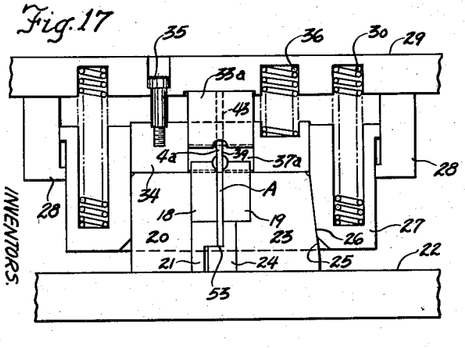

Referring next to Figs. 11 to 15, a blank A is shown supported on end between two lower die sections 18 and 19, section 18 being supported on fixed blocks 20 and 21 carried on bolster 22, and section 19 being mounted on a slide 23 movable on the bolster laterally toward and away from block 20 and having a filler plate 24 secured thereto. The inclined side 25 of the slide cooperates with the inclined inner side 26 of a clamping ring 27 that is slidable in keeper blocks 28 suitably secured to the ram 29 of the press. This slide 23, as disclosed in a copending application of Roy E. McCleary, Serial No. 362,253, filed June 17, 1953, now Patent No. 2,773,403, is arranged to be moved automatically to retracted position in the upstroke of the ram 29 after each upsetting operation, at which time the upset blank is automatically ejected from between the separated die sections 18 and 19. After the operator has inserted another blank A, tang end up, he operates a hand lever (not shown) to move the slide 23 inwardly toward closed position to approximately the position illustrated in Fig. 11, thereby closing a switch (not shown) to start the cycle of operation. The die sections 18—19 are fully closed positively in the first portion of the downward stroke of the ram, as appears in Fig. 12. Coiled compression springs 30 are interposed between the ram and ring 27 to allow the ram to continue its downward stroke after the clamping ring 27 has performed its die closing and clamping function, as illustrated in Figs. 12 and 13, compressing the springs 30 further. The die sections 18 and 19 are recessed, as indicated at 31, to provide the lower half of the die cavity that is shaped to predetermine the form of the head 4 in the upsetting of the tang 4a. The recess 32 forming the upper half of the die cavity is provided in the punch or upper die 33 that is suitably secured to the ram 29 and is slidable in a retaining ring 34, which in turn is slidably connected, as at 35, with the ram and has coiled compression springs 36 interposed between it and the ram so as to allow the ram to continue its downward stroke after ring 34 has seated on the lower die blocks 20 and 23, as in Fig. 12, namely, at the commencement of the upsetting operation. In the last portion of the downward stroke of the ram the punch 33 upsets the tang 4a to form the head 4, as shown in Fig. 13. In accordance with our invention, the tang 4a is closely confined at its lateral edges between two filler plates 37 fixed in the retaining ring 34 and having the punch 33 slidable closely therebetween. In that way, since the tang is held to its width dimension during the upsetting, the metal is not permitted to bulge outwardly at the lateral edges of the tang and there is accordingly much greater and more uniform compression of all of the metal throughout the tang end of the blank, the compression actually extending well into the shank portion, as stated before and indicated at 14 in Figs. 1 and 5, and, what is also very important, the surfaces 12 (Figs. 1 and 5) are extremely hard and smooth and also in accurate parallelism and closely to dimension, without the necessity for any machining. In the long stroke upsetting it should be clear from a study of Figs. 7 to 10 in conjunction with Figs. 12 to 15 that the confined metal at the lateral edges of the tang 4a is actually subjected to a sort of "ironing" operation, using the smooth inner faces 38 of the hardened filler plates 37 as the "irons," which accounts for the burnished, glassy smooth finish on the surfaces 12. The elimination of the extra milling operations otherwise required to produce the bearing surfaces 12 means an appreciable saving in cost. In the upsetting of tangs 6a on blanks B two punches similar to the punch 33, but, of course, much narrower, are provided in laterally spaced relation operating between three filler plates similar to the plates 37, so that each tang 6a is confined at its lateral edges during the upsetting operation in a similar manner for the same reasons.

Figure 18:
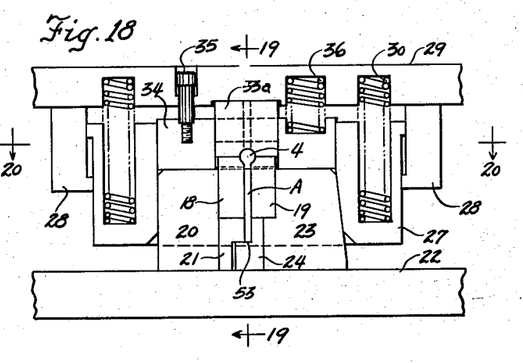
Figures 19, 20:
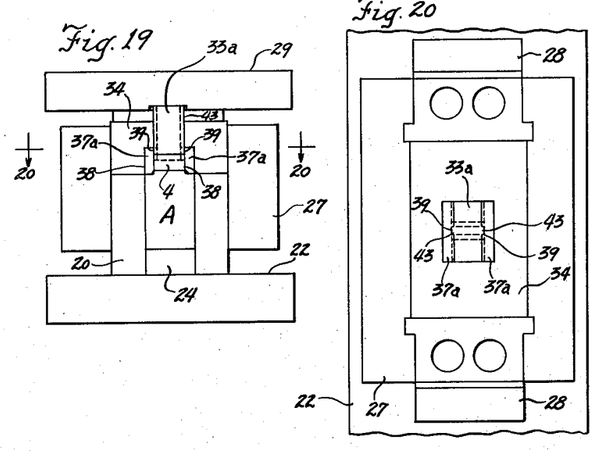
Figure 21:
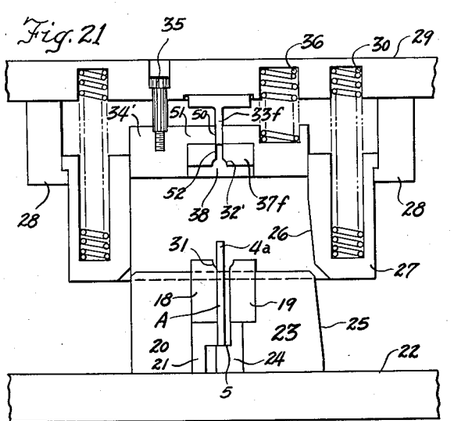
Figs. 21 to 25 are along the same lines as Figs. 11 to 15, showing still another set of dies of modified or alternative construction in which a separately movable blade section of the punch performs the upsetting operation.
Figures 31, 32, 33, 34, 35:
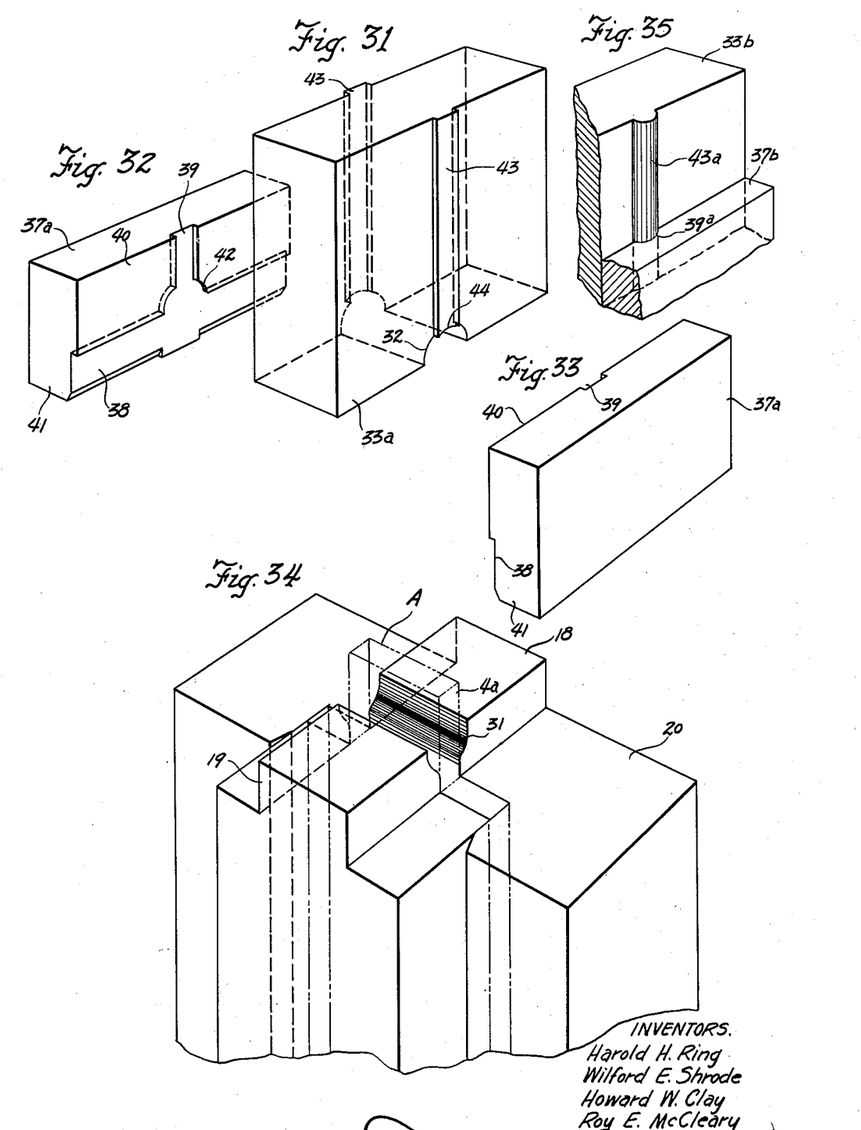
Figs. 31 to 34 are perspective views of the set of dies shown in Figs. 16 to 20 showing the parts in disassembled relation to better illustrate the construction.
Fig. 35 is a fragmentary perspective view of a punch of modified or alternative construction related to that of Figs. 31 to 33 and adapted to be used interchangeably with the die shown in Fig. 34.

In Figs. 16 to 20 identical parts have been correspondingly numbered, the same press being illustrated and the die set shown being the same in so far as the lower die sections 18 and 19 are concerned. The upper die or punch construction, however, is different, as more clearly appears in the perspective views Figs. 31 to 33 in which the punch 33a (Fig. 31) is shown in vertical alignment over the cooperating lower die sections 18 and 19 (Fig. 34), the filler plates 27a that cooperate with the punch 33a being shown in laterally spaced relation to the punch in Figs. 32 and 33. It will be seen that the filler plates 37a have vertical grooves 39 in the thicker upper portions 40 thereof, the bottoms of which are in coplanar relation to the flat inner faces 38 of the thinner lower portions 41, the lower ends of the grooves 39 being widened in arcs, as indicated at 42, to match and register with the ends of the half-round recess 32 provided in the lower end of the punch 33a when the punch reaches the end of its upsetting stroke, as shown in Figs. 18 and 19. The punch 33a has vertically extending ribs 43 on opposite sides which fit closely in the grooves 39 and these ribs have their lower ends arcuate, as indicated at 44, flush with the top of the half-round cavity 32 and adapted therefore to fill the gap between the arcuate low ends 42 of the grooves 39 when the punch 33a reaches the end of its upsetting stroke (Figs. 18 and 19). Now, when the blank A is inserted between the die sections 18 and 19 and these die sections are closed, as they appear in Fig. 34 and also in Fig. 17, the ram 29 having been brought down to the point where the upsetting operation is about to occur, the tank 4a, as clearly appears in Fig. 17, has its edge portions entered in the grooves 39 for support of the tang against buckling during the upsetting operation, in addition to confining the tang closely at its lateral edges between the surfaces 38 of the filler plates 37a to hold the tang to the original width dimension during the upsetting. Inasmuch as the ribs 43 on the punch 33a fill the grooves 39, the full width of the tang 4a is subjected to compression and it is evident that when the punch 33a reaches the end of the upsetting stroke where the arcuate lower ends 44 of the ribs 43 form flush continuations of the arcs 42 at the lower ends of the grooves 39, the ends of the head 4 produced in the upsetting operation will be substantially as smoothly arcuate as all portions of the head intermediate these ends. The elimination of any possibility of the tang buckling insures the uniform and symmetrical compacting of the metal illustrated by the lines 17 in Fig. 6. A uniformly upset head has much greater strength and durability than one in which the metal in one side of the head 4 is compressed to a greater extent than on the other side. The same procedure of holding the lateral edge portions of the tangs to width dimension and against buckling is followed in the upsetting of the tangs 6a on blanks B for the same reasons.

Where the edge portions of the strip stock from which the blanks A and B are punched, as shown in Fig. 3, are arcuate instead of square, the filler plates, instead of having rectangular grooves 39, will have round bottom grooves like that shown in 39a in the filler plate 37b in Fig. 35, and the ribs 43a fitting in these grooves 39a will be similarly rounded, as shown on the punch 33b. Otherwise the same construction as disclosed in Figs. 31 to 33 will be used.

Figure 1:
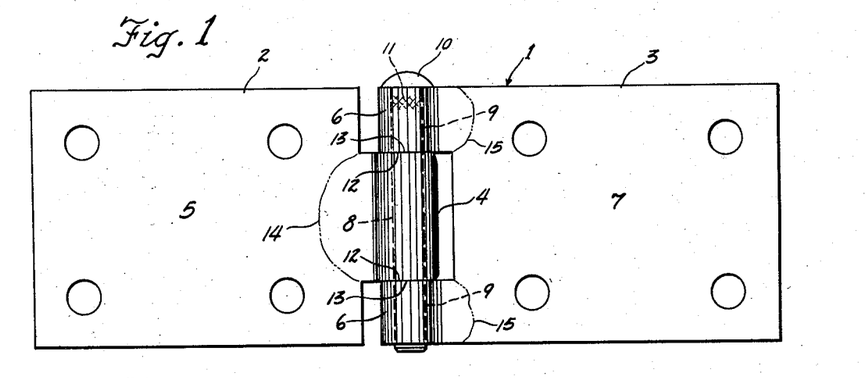
Figs. 1 and 2 are a face view and bottom view, respectively, of a butt hinge, both members of which are made in accordance with our invention, Fig. 1 having the areas of compressed metal indicated in faint outline.
Figures 36, 37, 38, 45:
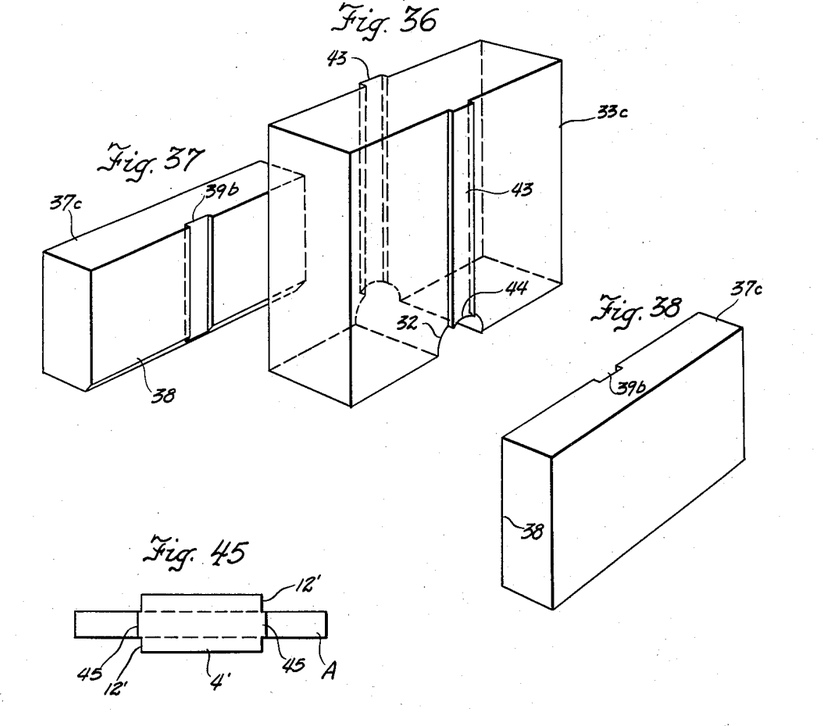
Figs. 36 to 38 are views similar to Figs. 31 to 33 showing still another modified or alternative punch construction adapted to be used interchangeably with the die shown in Fig. 34.
Figs. 45 to 47 are a top view, face view and edgewise view, respectively, of an upset blank produced with a set of dies like that shown in Figs. 36 to 38 and 34.
Figure 46:
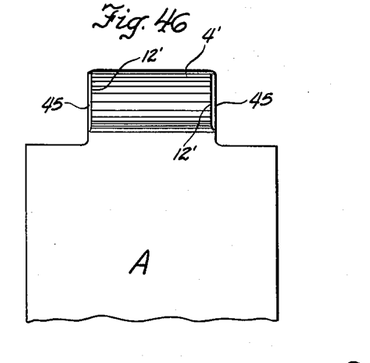
Figure 47:
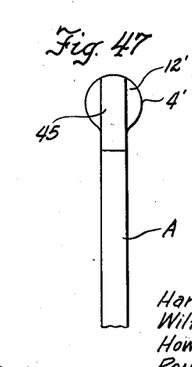
Figure 48:
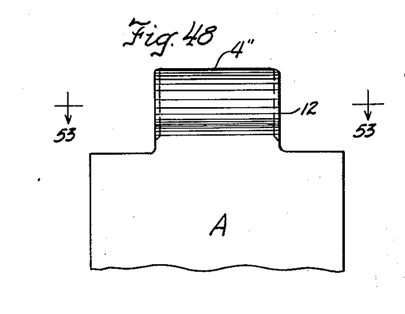
Figs. 48 and 49 are a face view and edgewise view, respectively, of an upset blank produced with a set of dies, as shown in Figs. 39 to 41 and 34, and related
Figure 49:
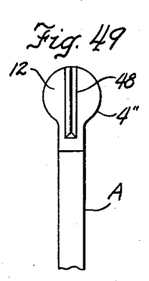
Figure 53:
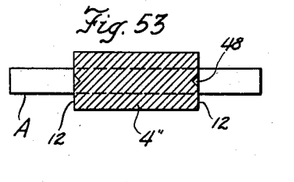

In Figs. 36 to 38 are shown a punch 33c and cooperating filler plates 37c adapted to cooperate with the same lower die sections 18—19 shown in Fig. 34. The punch 33c is substantially the same as the punch 33a and, therefore, corresponding portions thereof have been numbered alike. However, the filler plates 37c have vertical grooves 39b extending the full height thereof so as to provide support for the lateral edge portions of the tang 4a substantially the full length thereof when the ram comes down after the lower die sections have closed, as in Fig. 17, and the die set is in readiness for the commencement of the upsetting operation. Consequently, when the punch 33c is moved down in the upsetting operation, the tang is upset as in the previous cases but there is left at each end of the head 4' a projecting rib 45 extending diametrically with respect to the end surfaces 12' on the head or knuckle 4', as shown in Figs. 45 to 47. The overall dimension between the outer faces of the ribs 45 is the original width of the tang 4a and the flat surfaces on these ribs may be used in the same way as the bearing surfaces 12 on head or knuckle 4, or, if desired, the width of the tang 4a in punching the blank may be increased enough to allow for the subsequent shaving off of the ribs 45 to provide flat bearing surfaces on the ends of the head or knuckle 4', making the head or knuckle as thus finally produced of the same dimensions as the head 4 (Figs. 1 and 5). It will, of course, be understood that the same procedure just described as applied to the tang 4a of the male blank A may be followed in the upsetting of the tangs 6a on the female blank B, but, of course, if allowance is to be made for shaving off of the projecting ribs 45, the procedure illustrated in Fig. 3 of punching the male and female blanks from neighboring portions of a strip to eliminate wasting any metal could not be followed, for obvious reasons.

Figures 39, 40, 41, 50, 51, 52:
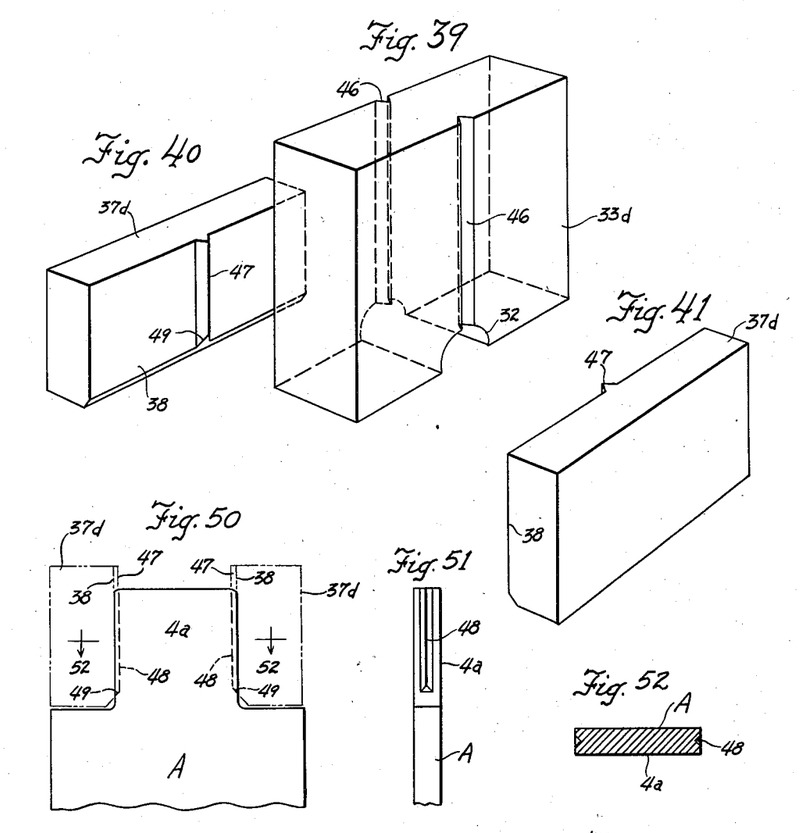

A further alternative is shown in Figs. 39 to 41 and related Figures 48 to 53, in which provision is made for staking the edge portions of the tang 4a by grooving the same preliminary to the upsetting operation to prevent buckling and insure symmetrical compacting of the metal in the upsetting operation. It will be understood that the punch 33d (Fig. 39) and cooperating filler plates 37d (Figs. 40–41) are adapted to be used with the same lower die sections 18 and 19 shown in Fig. 34 and that the punch 33d operates closely between the filler plates 37d similarly as in the die sets previously described. In this construction, however, the arrangement of the projections on the punch and grooves in the die plates, as shown in Figs. 36–38, is reversed and the punch 33d has vertical V-grooves 46 provided in the opposite sides thereof extending all the way down to the half-round recess 32 in the lower end of the punch, and there are V-shaped ribs 47 on plates 37d that fit closely in these grooves, and, as indicated in Fig. 50, are arranged to cut V-shaped grooves 48 in the edges of the tang 4a when the ram 29 is brought down to the position shown in Fig. 17 after the die sections 18 and 19 have been closed and everything is in readiness for the upsetting operation to occur. The lower ends of the ribs 47 are bevelled off, as shown at 49, to form pilot portions and facilitate the scoring or grooving of the edges of the tang in the manner described. Now, it is manifest that with the tang thus staked to the filler plates 37d at its opposite edges, there is no danger of the tang buckling during the upsetting operation, and, accordingly, symmetrical compacting of the metal in the upsetting operation is assured. The upset blank, as finally produced, appears in Figs. 48, 49 and 53, in which the head or knuckle is numbered 4″. The bearing surfaces 12 are the same burnished, glassy smooth surfaces as produced with the die sets of Figs. 11 to 15 and 16 to 20, the only difference in the product here being that there are V-shaped grooves 48 extending diametrically of both ends of the head or knuckle 4″. These grooves are not objectionable but are actually definitely advantageous as oil grooves. Although we have just described the procedure as applied to the upsetting of the tang 4a on a male blank A, it will, of course, be understood that the same procedure is followed in the upsetting of the tangs 6a on female blanks B for the same reasons.

Figures 42, 43, 44, 54, 55, 56, 57, 58, 59, 60:
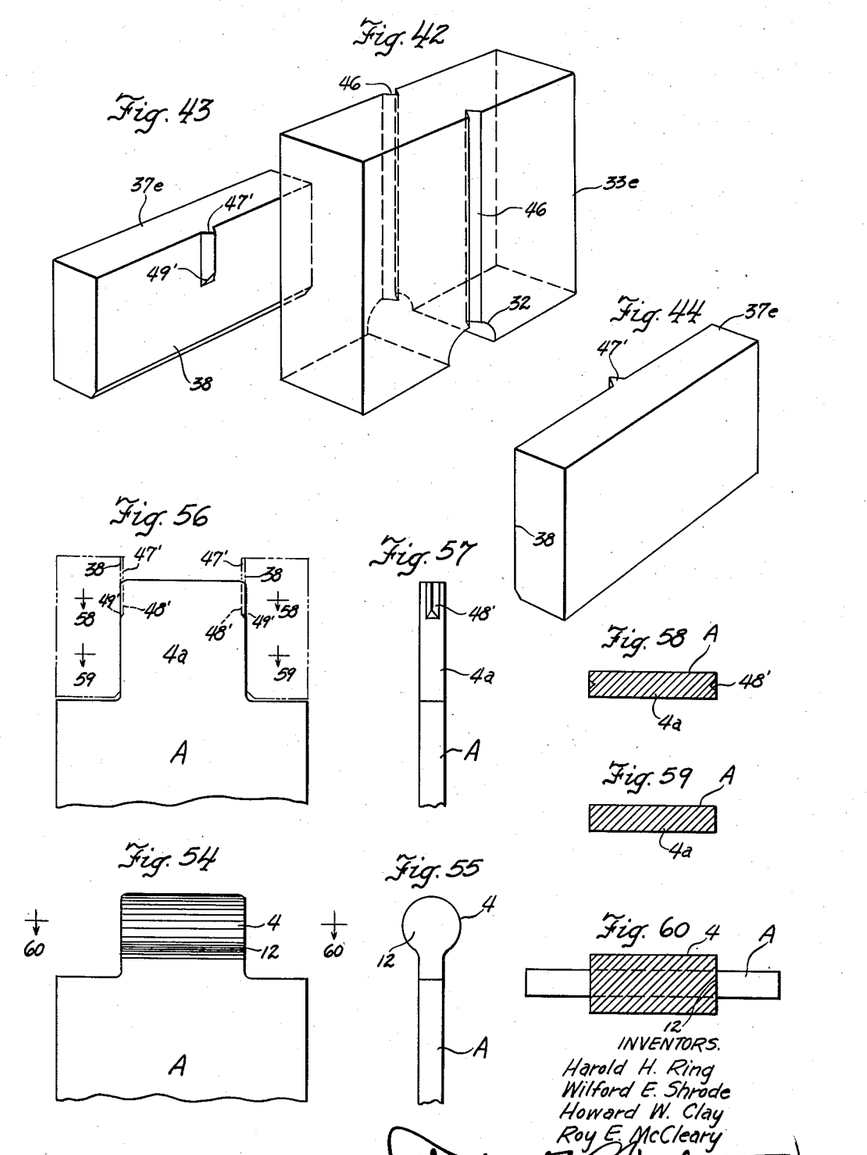

Figs. 42 to 44 and related Figures 54 to 60 illustrate a closely similar construction to that just described wherein the staking of the tang 4a preliminary to the upsetting operation is limited to the upper end portion of the tang, as shown in Figs. 56 and 57, so that in the upsetting operation the grooves 48′ are erased and the end bearing surfaces 12 produced on the head or knuckle 4 are flat and there is no trace or evidence whatsoever that the tang was previously scored or grooved. For this procedure the punch 33e is substantially the same as the punch 33d and corresponding portions have been accordingly numbered. The cooperating filler plates 37e are similar to filler plates 37d but the vertical V-shaped ribs 47′ provided thereon extend only part-way down from the top on the inner faces 38 of these plates to score or groove only the upper end portion of the tang 4a, as indicated at 48′ in Fig. 56. The upsetting operation with this construction is believed to be obvious in view of the description of the previous set of figures, and, while reference is made here only to the scoring or grooving of the tang 4a on male blanks A, it will, of course, be understood that the same procedure is followed in operating on tangs 6a of the female blanks B.

Figure 22:
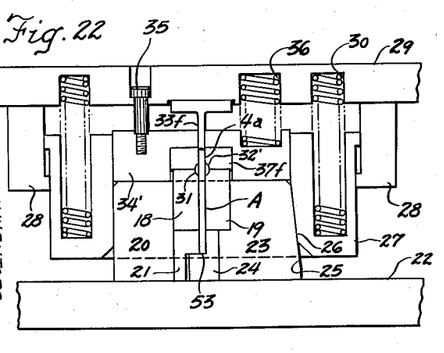
Figure 23:
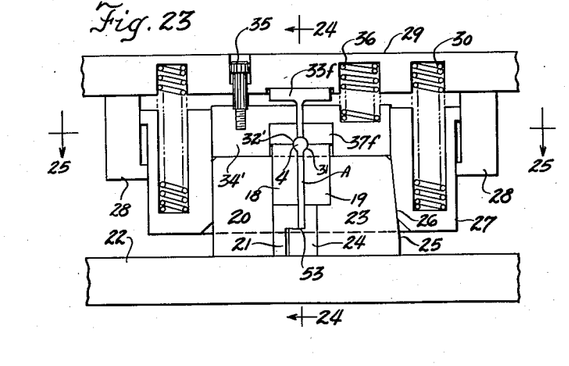
Figure 24:
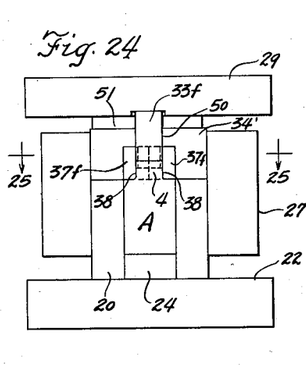
Figure 25:
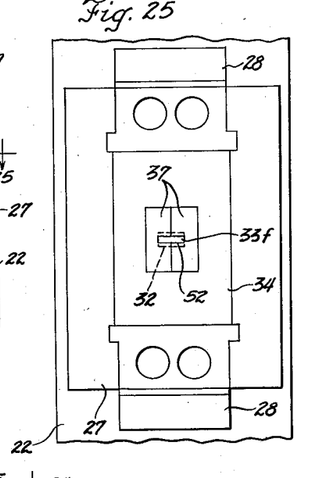
Figure 26:
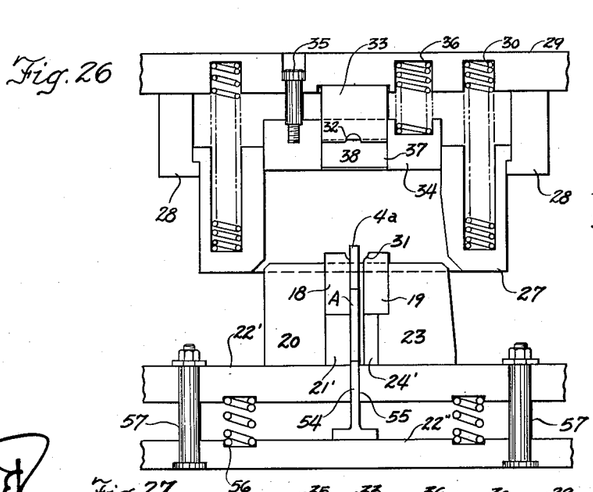
Figs. 26 to 30 are views similar to Figs. 11 to 15 showing a still further set of dies of modified or alternative construction having a separately movable blade in the lower die structure to cooperate with the punch in performing the upsetting operation.

Referring now to Figs. 21 to 25, the press disclosed is substantially the same as that shown in Figs. 11 to 15 and 16 to 20 and corresponding parts have been numbered alike. The lower die sections 18 and 19 are the same as in the other figures and similarly mounted and operated, and corresponding parts have been numbered alike. The upper die or punch construction, however, is different, the same being of sectional construction to afford complete confinement and support of the tang portion 4a from all four sides preliminary to the upsetting operation, as illustrated in Fig. 22, that figure corresponding to Figs. 12 and 17 and showing the ram moved down part-way with the die set in readiness for the upsetting to occur. Here the punch is in the form of a blade 33f of the same cross-sectional dimensions as the tang 4a, the same operating through a slot 50 provided in the top wall 51 of the retaining ring 34′ and through registering notches 52 in a pair of die plates 37f. The die plates 37f have half-round recesses 32′ provided in the bottom thereof. Hence, when the die is in readiness for the upsetting operation, as appears in Fig. 22, the tang 4a is supported in notches 52 in die plates 37f on all four sides and its width dimension cannot change in the upsetting nor can there be any buckling of the tang during upsetting, and, when the ram moves down the rest of the stroke, forcing the blade 33f down to the cavity 32′, as appears in Fig. 23, the tang 4a is upset and fills out the die cavity to form the head or knuckle 4, as it appears in Fig. 5, the upsetting operation here most closely resembling that obtained with the die set shown in Figs. 16 to 20, because in that form of the invention the lateral edge portions of the tang are likewise supported to prevent buckling of the tang in the upsetting operation. It will, of course, be understood that whereas we have referred here only to the upsetting of tang 4a on the male blank A, a similar construction is used in the upsetting of the tangs 6a on the female blanks B.

Figure 27:
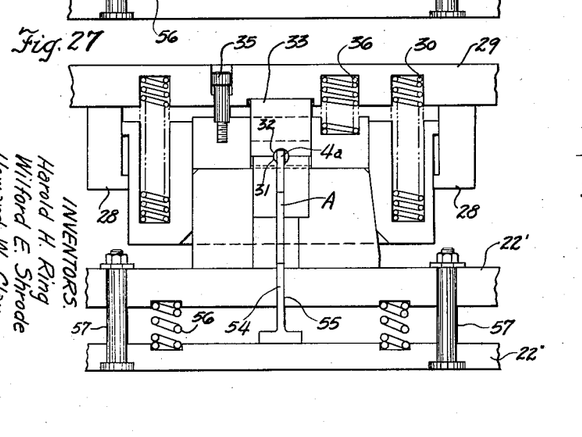
Figure 28:
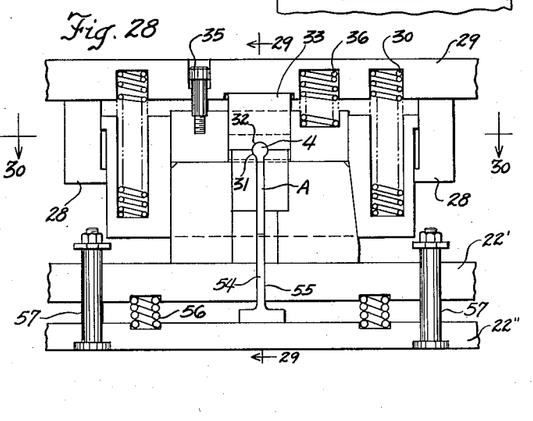
Figure 29:
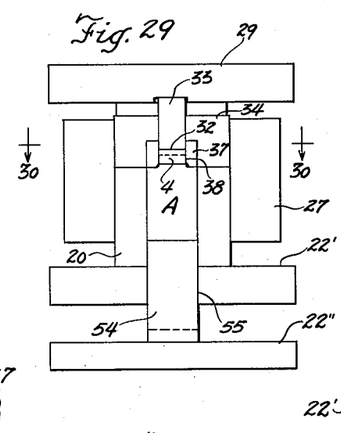
Figure 30:
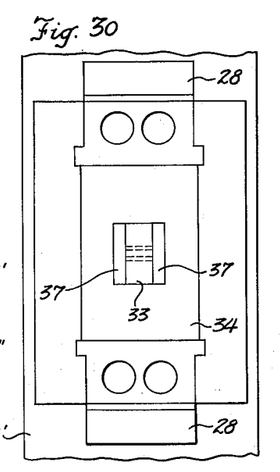

Referring next to Figs. 26 to 30, the press disclosed is similar to that of Figs. 11 to 15 in so far as the upper or ram section is concerned and also the punch or upper die section. Hence, all of those parts that correspond have been numbered alike. However, the lower or bolster section of the press is in two parts 22′ and 22″, the upper bolster 22′ carrying die sections 18 and 19 in substantially the same way as on bolster 22 in the other forms, but having the filler blocks 21′ and 24′ of different form omitting the shoulder 53 for support of the blank, inasmuch as the blank in this form is adapted to be supported on a blade 54 that extends upwardly from the lower bolster 22″ in a plane between the die sections 18 and 19 through a slot 55 in bolster 22′. The blade 54 is carried on and fixed to the lower bolster section 22″ and there are heavy coiled compression springs 56 between the bolster sections normally urging the same apart to the extent permitted by brackets 57 until the die set is in readiness for the upsetting operation to occur, as illustrated in Figs. 27, after which, in the final downward movement of the ram the upper bolster section 22′ is forced down relative to the lower bolster section 22′, as shown in Fig. 28, causing the tang 4a on the blank A supported on blade 54 to be upset by punch 33. Here again, the tang 4a is confined at its lateral edges between the flat inner faces 38 of the filler plates 37 so that the width dimension is maintained during the upsetting operation similarly as in the operation of the die set shown in Figs. 11 to 15. It is, of course, understood that although reference is made here only to the upsetting of tang 4a on blank A, tangs 6a on blank B can be similarly upset.

Figure 61:
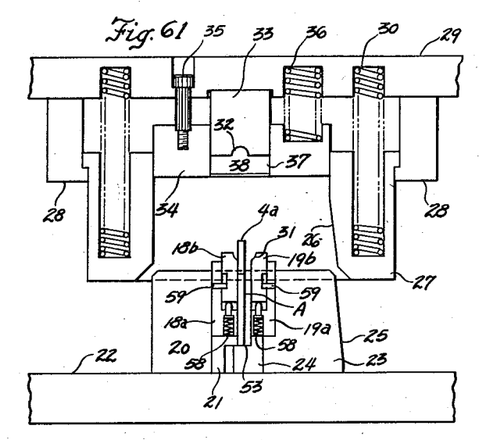
Figure 62:
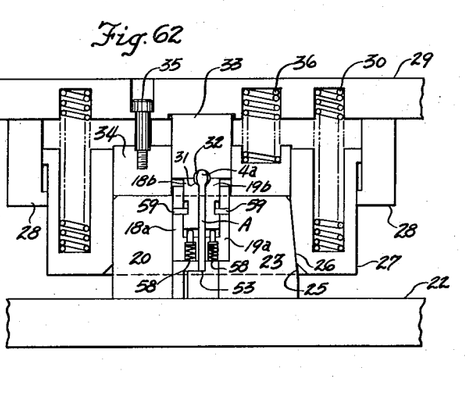
Figure 63:
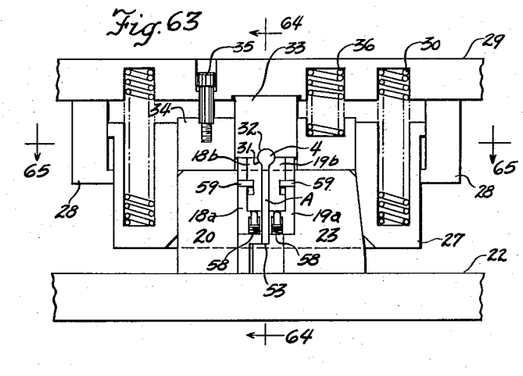
Figures 64, 65:
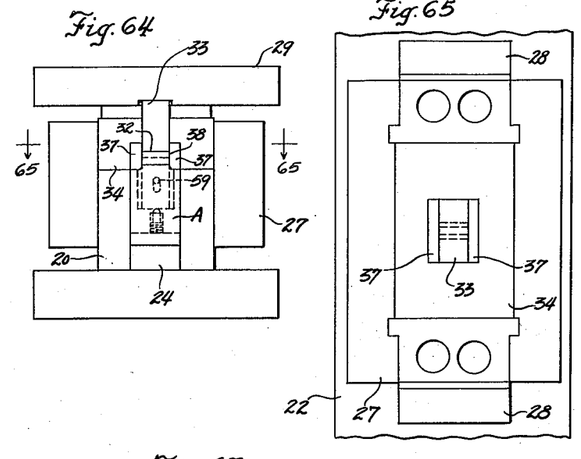

Referring, finally, to Figs. 61 to 65, the press disclosed is substantially the same as that of Figs. 11 to 15 and 16 to 20, and corresponding parts have been numbered alike. The upper die or punch 33 has a half-round recess 32 in the bottom thereof forming the upper half of the die cavity, and is movable closely between two filler plates 37, so that the tang 4a during the upsetting operation is closely confined between the flat faces 38 provided on these plates, to maintain the width dimension and provide the flat bearing surfaces 12 on the head or knuckle 4, similarly as described before in referring to the other die sets. The lower die sections 18a and 19a have separate inner sections 18b and 19b suitably guided for vertical movement relative to the stationary outer sections and supported on heavy coiled compression springs 58, pins 59 serving to limit upward movement of the die sections 18b and 19b, as indicated in Figs. 61 and 62. Fig. 62 shows the lower die sections 18b and 19b closed, with the tang 4a of blank A partially upset, that being done in the downward movement of the punch 33 as the ring 34 seats on the die blocks 20 and 23, the lower die sections 18b and 19b at this point being still fully extended under action of springs 58 to the extent limited by pins 59, so that they confine as well as support the tang 4a fairly close up to the upper end that is upset in this initial stage of upsetting, thereby holding the tang to width dimension and reducing likelihood of the tang buckling, even though there is no staking of the lateral edge portions and no supporting of these edge portions in grooves. In the final portion of the downward movement of the ram 29, as shown in Figs. 63, the lower die sections 18b and 19b move with the punch 33 as the final portion of the upsetting operation is performed to produce the head or knuckle 4. It will, of course, be understood that whereas we have referred here only to the upsetting of tang 4a on the male blank A, a similar construction is used in the upsetting of the tangs 6a on the female blanks B.

In conclusion, while we have shown only a butt hinge, it should be obvious that the invention is also applicable to concealed hinges, because, looking at Figs. 7a to 10a, it is evident that in the upsetting operation the full width of the end portion of the blank A could be upset just as easily as the tang 4a, and thus the inner members of concealed hinges may be produced in the same way as the butt hinge members herein shown, namely, to provide the smooth hard end bearing surfaces on opposite ends of the upset portion in the upsetting operation, instead of in a subsequent machining operation by close confinement of the lateral edges during upsetting.

It is believed the foregoing description conveys a good understanding of the objects and advantages of our invention. The appended claims have been drawn to cover all legitimate modifications and adaptations.

We claim:

1. The herein described method of making hinge members from strip metal stock of appropriate rectangular cross-sectional dimensions by cold upsetting, which consists in cutting elongated rectangular blanks from the strip, the blanks being cut so as to have projecting from their ends elongated rectangular tang portions, then cutting shallow grooves in the lateral edges of the tang or tangs lengthwise thereof and, while the groove cutting tools are still entered in these grooves supporting the tangs to prevent buckling thereof during the upsetting operation, cold upsetting the outer end portions of the tangs to form knuckles on said tangs, and thereafter drilling pintle holes lengthwise of the knuckle portions.

2. The herein described method of making hinge members from strip metal stock of appropriate rectangular cross-sectional dimensions by cold upsetting, which consists in cutting elongated rectangular blanks from the strip, the blanks being cut so as to have projecting from their ends elongated rectangular tang portions, then cutting shallow grooves in the lateral edges of the tang or tangs lengthwise thereof and, while the groove cutting tools are still entered in these grooves supporting the tangs to prevent buckling thereof during the upsetting operation and at the same time confining the tang or tangs laterally to maintain the width dimension thereof accurately during such upsetting, cold upsetting the outer end portions of the tangs to form knuckles on said tangs, and thereafter drilling pintle holes lengthwise of the knuckle portions.

3. The herein described method of making hinge members from strip metal stock of appropriate rectangular cross-sectional dimensions by cold upsetting, which consists in cutting elongated rectangular blanks from the strip, the blanks being cut so as to have projecting from their ends elongated rectangular tang portions, then cutting shallow grooves in the lateral edges of the tang or tangs lengthwise thereof in only the outer end portion and, while the groove cutting tools are still entered in these grooves supporting the tangs to prevent buckling thereof during the upsetting operation and at the same time confining the tang or tangs laterally to maintain the width dimension thereof accurately during such upsetting, cold upsetting the outer end portions of the tangs to form knuckles on said tangs using at least the entire length of grooved outer end portions so as to fill up the grooves and thereby provide flat smooth bearing surfaces on the ends of the knuckles, and thereafter drilling pintle holes lengthwise of the knuckle portions.

4. The herein described method of making hinge members from strip metal stock of appropriate rectangular cross-sectional dimensions by cold upsetting, which consists in cutting elongated rectangular blanks from the strip, the blanks being cut so as to have projecting from their ends elongated rectangular tang portions, then cutting shallow grooves in the lateral edges of the tang or tangs lengthwise thereof and extending nearly the full length and, while the groove cutting tools are still entered in these grooves supporting the tangs to prevent buckling thereof during the upsetting operation and at the same time confining the tang or tangs laterally to maintain the width dimension thereof accurately during such upsetting, cold upsetting the outer end portions of the tangs to form knuckles on said tangs having flat smooth bearing surfaces on the ends of the knuckles with shallow grooves extending diametrically thereof, and thereafter drilling pintle holes lengthwise of the knuckle portions.

References Cited in the file of this patent

UNITED STATES PATENTS

| | | |
|---|---|---|
| 625,443 | Glover | May 23, 1899 |
| 1,427,521 | Clouse | Aug. 29, 1922 |
| 1,688,955 | Atwood | Oct. 23, 1928 |
| 1,691,879 | Blakeslee | Nov. 13, 1928 |
| 2,031,244 | Abbe | Feb. 18, 1936 |
| 2,058,341 | Mink | Oct. 20, 1936 |
| 2,288,013 | Moynahan et al. | June 30, 1942 |
| 2,569,862 | Morin | Oct. 2, 1951 |